United States Patent
Shamray et al.

(10) Patent No.: US 7,335,402 B2
(45) Date of Patent: Feb. 26, 2008

(54) RADIATION CURABLE PUTTY COMPOSITIONS AND METHODS FOR REFINISHING A SUBSTRATE USING SUCH COMPOSITIONS

(75) Inventors: Tracy A. Shamray, Brooklyn, OH (US); Albert C. Zadroga, Avon Lake, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 322 days.

(21) Appl. No.: 11/075,504

(22) Filed: Mar. 9, 2005

(65) Prior Publication Data

US 2006/0205836 A1    Sep. 14, 2006

(51) Int. Cl.
C08F 2/46 (2006.01)
C08F 2/48 (2006.01)
C09D 5/44 (2006.01)
C08K 5/00 (2006.01)

(52) U.S. Cl. .............. 427/496; 427/508; 522/113; 522/121; 522/134; 522/142; 522/101; 522/102

(58) Field of Classification Search ........... 522/103, 522/121, 142, 113, 134, 101, 102; 427/508, 427/496
See application file for complete search history.

(56) References Cited

U.S. PATENT DOCUMENTS

| | | | | |
|---|---|---|---|---|
| 3,993,798 A * | 11/1976 | Brose et al. | ............ | 427/500 |
| 4,668,529 A | 5/1987 | Blair | ............ | 427/54.1 |
| 4,960,611 A | 10/1990 | Fujisawa et al. | ............ | 427/43.1 |
| 5,407,707 A | 4/1995 | Simeone et al. | ............ | 427/410 |
| 5,516,813 A | 5/1996 | Starkey | ............ | 522/25 |
| 6,312,765 B1 | 11/2001 | Ueno | ............ | 427/510 |
| 6,350,792 B1 * | 2/2002 | Smetana et al. | ............ | 522/81 |
| 6,531,188 B1 | 3/2003 | Maag et al. | ............ | 427/492 |
| 6,699,942 B2 | 3/2004 | Barkac et al. | ............ | 525/327.3 |
| 6,818,153 B2 * | 11/2004 | Burnell-Jones | ............ | 252/301.36 |

FOREIGN PATENT DOCUMENTS

| | | |
|---|---|---|
| EP | 0 774 492 A2 | 5/1997 |
| EP | 0 825 201 A1 | 2/1998 |
| EP | 0 983 801 A2 | 3/2000 |

OTHER PUBLICATIONS

International Search Report mailed Jul. 18, 2006 for International Application No. PCT/US2006/008643, corresponding to the U.S. Appl. No. 11/075,504.

* cited by examiner

*Primary Examiner*—Susan W. Berman
(74) *Attorney, Agent, or Firm*—Donald R. Palladino

(57) ABSTRACT

Disclosed are radiation curable putty compositions that include (a) a radiation curable material, (b) a radiation cure initiator, and (c) a filler comprising a polymer, such as a polymer that is transparent to ultraviolet radiation. Also disclosed are methods for refinishing a coated substrate utilizing such putty compositions, and articles coated with such putty compositions.

20 Claims, No Drawings

RADIATION CURABLE PUTTY COMPOSITIONS AND METHODS FOR REFINISHING A SUBSTRATE USING SUCH COMPOSITIONS

FIELD OF THE INVENTION

The present invention is generally directed to the repair of deformities in articles, such as scratches, holes and dents in automobile parts. More particularly, the present invention relates to putty compositions suitable for use in such repairs and methods for refinishing an article using such compositions.

BACKGROUND INFORMATION

In the refinishing field, putty compositions are often employed as part of the process of repairing deformities, such as scratches and/or depressions in automobile body parts. In such processes, the putty composition is often applied to the deformity, cured, sanded and finished with suitable painting steps to complete the refinish process.

At least partly due to improved efficiencies achieved by reduced curing times, putty compositions (sometimes identified as filler compositions) that are curable by ultraviolet radiation have been proposed. For example, U.S. Pat. No. 4,668,529 ("the '529 patent") discloses a composition that can be cured in less than approximately five minutes when subjected to relatively high intensity ultraviolet radiation. The composition disclosed in the '529 patent includes a specific mixture of an epoxy resin, a di-functional acrylate cross-linking agent, a tri-functional acrylate cross-linking agent, a photoinitiator, an accelerator, dioctyl phthalate, and a filler, such as calcium sulfate dihydrate.

In another example, U.S. Pat. No. 6,312,765 ("the '765 patent") discloses a putty composition that can be cured in about 30 to 60 seconds using an apparatus equipped with a 1.2 kW metal halide lamp. The putty compositions disclosed in the '765 patent include a specific mixture of an ultraviolet polymerizing prepolymer, an ultraviolet polymerizing monomer, an ultraviolet polymerizing initiator, and an extender pigment, such as calcium carbonate, barium sulfate, clay, talc, tonoko, white-carbon, and balloon.

One drawback of prior art putty compositions that are curable by ultraviolet radiation, such as those described above, is that they require the use of a relatively high intensity ultraviolet radiation source, such as the 1.2 kW metal halide lamps mentioned earlier, to effect adequate cure of the composition in a reasonable period of time, while achieving acceptable properties, such as sanding, adhesion and humidity properties. The use of such high intensity radiation equipment, however, has some drawbacks. For example, higher intensity radiation equipment, such as the lamps mentioned earlier, is larger and more difficult to handle than lower intensity equipment. Moreover, high intensity radiation equipment is more expensive to purchase and also more expensive to operate because they consume more energy than low intensity radiation sources. In addition, the use of high intensity ultraviolet radiation is undesirable in many situations because of the possibility of human exposure. Exposure to high intensity ultraviolet radiation is more harmful to humans than exposure to lower intensity ultraviolet radiation.

SUMMARY OF THE INVENTION

In one respect, the present invention is directed to radiation curable putty compositions comprising: (a) a radiation curable material, (b) a radiation cure initiator, and (c) a filler comprising a polymer, such as a polymer that is transparent to ultraviolet radiation.

In another respect, the present invention is directed to radiation curable putty compositions comprising: (a) at least 30 percent by weight of a radiation curable material; (b) 0.01 up to 15 percent by weight of a radiation cure initiator; (c) at least 5 percent by weight of a filler comprising a polymer, such as a polymer that is transparent to ultraviolet radiation; (d) at least 0.1 percent by weight of an adhesion promoter; and (e) at least 0.1 percent by weight of an optical brightener.

In another respect, the present invention is directed to methods for refinishing a coated substrate comprising the steps of: (a) applying to at least a portion of the substrate a putty composition of the present invention; (b) curing the filler composition by exposing the composition to radiation; and (c) applying to at least a portion of the substrate a protective and/or decorative coating system.

In yet another respect, the present invention is directed to methods for improving the curability of a radiation curable putty composition when using low intensity ultraviolet radiation as the curing means, comprising including in the radiation curable composition a filler comprising a polymer that is transparent to ultraviolet radiation.

In still other respects, the present invention is directed to articles coated with the compositions of the present invention and articles coated by the methods of the present invention.

DETAILED DESCRIPTION OF EMBODIMENTS OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In this application, the use of "or" means "and/or" unless specifically stated otherwise.

The present invention is directed to putty compositions that are radiation curable. As used herein, the term "putty composition" refers to compositions that are thick or viscous enough to fill in a deformity in the surface of an article, such as a dent, hole, or scratch when applied with, for example, a spatula or putty knife. The term "putty composition" is meant to encompass the term "filler composition" that is sometimes used in the art. In certain embodiments, the putty compositions of the present invention are of a thickness sufficient to enable the composition to be applied at a film thickness of at least 20 mils (508 microns) or, in some cases, at least 70 mils (1778 microns) in a single layer.

The putty compositions of the present invention are radiation curable. As used herein, the term "radiation curable composition" refers to compositions that can be converted to a finished condition, i.e., a hardened film, upon exposure of the composition to an energy source, such as an electron beam (EB), ultraviolet radiation, or visible light. In certain embodiments, the compositions of the present invention can be converted to such a condition in a short period of time, i.e., less than about 5 minutes, by exposure of the composition to low intensity ultraviolet radiation. As used herein, "low intensity ultraviolet radiation" refers to radiation intensities of no more than about 400 watts, or, in certain embodiments, no more than about 250 watts. In certain embodiments, the compositions of the present invention can be cured relatively quickly using low intensity ultraviolet radiation, while still achieving acceptable performance properties, such as sanding, adhesion, stone chip resistance, and humidity properties, among others.

The radiation curable putty compositions of the present invention comprise: (a) a radiation curable material, (b) a radiation cure initiator, and (c) a filler comprising a polymer, such as a polymer that is transparent to ultraviolet radiation.

The compositions of the present invention comprise a radiation curable material. As used herein, the term "radiation cure" refers to polymerization that occurs upon exposure of a material to an energy source, such as an electron beam (EB), ultraviolet light, or visible light. As used herein, the term "radiation curable material" refers to materials having reactive components that are polymerizable by exposure to an energy source, such as those energy sources mentioned earlier. In certain embodiments, the compositions of the present invention comprise monomer(s) and/or oligomer(s) that are polymerizable by exposure to ultraviolet radiation.

In certain embodiments, the radiation curable material comprises a multi-functional (meth)acrylate. As used herein, the term "multi-functional (meth)acrylate" refers to monomers and/or oligomers having an acrylate functionality of greater than 1. In the compositions of the present invention, upon exposure to radiation, a radical induced polymerization of the multi-functional (meth)acrylate occurs. As used herein, "(meth)acrylate" and terms derived therefrom are intended to include both acrylates and methacrylates.

(Meth)acrylates suitable for use in the putty compositions of the present invention include epoxy (meth)acrylates, urethane (meth)acrylates, polyester (meth)acrylates, polyether (meth)acrylates, and acrylic (meth)acrylates, among others.

Multi-functional (meth)acrylates suitable for use in the putty compositions of the present invention include, without limitation, difunctional, trifunctional, tetrafunctional, pentafunctional, hexafunctional (meth)acrylates and mixtures thereof. In certain embodiments, difunctional (meth)acrylates are used.

Representative examples of suitable multi-functional (meth)acrylates include, without limitation, ethylene glycol di(meth)acrylate, 1,3-butylene glycol di(meth)acrylate, 1,4-butanediol diacrylate, 2,3-dimethylpropane 1,3-diacrylate, 1,6-hexanediol di(meth)acrylate, dipropylene glycol diacrylate, ethoxylated hexanediol di(meth)acrylate, propoxylated hexanediol di(meth)acrylate, neopentyl glycol di(meth)acrylate, alkoxylated neopentyl glycol di(meth)acrylate, hexylene glycol di(meth)acrylate, diethylene glycol di(meth)acrylate, tripropylene glycol di(meth)acrylate, thiodiethylene glycol diacrylate, trimethylene glycol dimethacrylate, pentaerythritol tri(meth)acrylate, trimethylolpropane tri(meth)acrylate, ditrimethylolpropane tetra (meth)acrylate, glycerolpropoxy tri(meth)acrylate, ethoxylated trimethylolpropane tri(meth)acrylate, and tetraethylene glycol di(meth)acrylate and mixtures thereof.

In certain embodiments, the putty compositions of the present invention comprise a low viscosity, i.e., no more than 1500 centipoise at 25° C., difunctional epoxy acrylate. Such difunctional epoxy acrylates are commercially available. One such product is commercially available as CN132 oligomerfrom Sartomer Co., Exton, Pa.

In certain embodiments, the putty compositions of the present invention comprise at least 30 percent by weight of the radiation curable material or, in some embodiments, 30 to 95 percent by weight or, in yet other embodiments, 30 to 50 percent by weight of the radiation curable material based on the total weight of the putty composition.

As previously indicated, the putty compositions of the present invention also comprise a radiation cure initiator. For example, in certain embodiments, particularly when the radiation curable composition is to be cured by ultraviolet radiation, the compositions of the present invention comprise a photoinitiator. As will be appreciated by those skilled in the art, a photoinitiator absorbs radiation during cure and transforms it into chemical energy available for the polymerization. Photoinitiators are classified in two major groups based upon a mode of action, either or both of which may be used in the compositions of the present invention. Cleavage-type photoinitiators include acetophenones, α-aminoalkylphenones, benzoin ethers, benzoyl oximes, acylphosphine oxides and bisacylphosphine oxides and mixtures thereof. Abstraction-type photoinitiators include benzophenone, Michler's ketone, thioxanthone, anthraquinone, camphorquinone, fluorone, ketocoumarin and mixtures thereof.

Specific nonlimiting examples of photoinitiators that may be used in the putty compositions of the present invention include benzil, benzoin, benzoin methyl ether, benzoin isobutyl ether benzophenol, acetophenone, benzophenone, 4,4'-dichlorobenzophenone, 4,4'-bis(N,N'-dimethylamino) benzophenone, diethoxyacetophenone, fluorones, e.g., the H-Nu series of initiators available from Spectra Group Ltd., 2-hydroxy-2-methyl-1-phenylpropan-1-one, 1-hydroxycyclohexyl phenyl ketone, 2-isopropylthixantone, α-aminoalkylphenone, e.g., 2-benzyl-2-dimethylamino-1-(4-morpholinophenyl)-1-butanone, acylphosphine oxides, e.g., 2,6-dimethylbenzoyldlphenyl phosphine oxide, 2,4,6-trimethylbenzoyldiphenylphosphine oxide, bis (2,4,6-trimethylbenzoyl) phenyl phosphine oxide, 2,6-dichlorobenzoyl-diphenylphosphine oxide, and 2,6- dimethoxybenzoyldiphenylphosphine oxide, bisacylphosphine oxides, e.g., bis(2,6-dimethyoxybenzoyl)-2,4,4-trimethylepentylphosphine oxide, bis(2,6-dimethylbenzoyl)-2,4,4-trimethylpentylphosphine oxide, bis (2,4,6-trimethylbenzoyl)-2,4,4-trimethylpentylphosphine oxide, and bis(2,6-dichlorobenzoyl)-2,4,4-trimethylpentylphosphine oxide, and mixtures thereof.

In certain embodiments, the putty compositions of the present invention comprise 0.01 up to 15 percent by weight of the radiation cure initiator or, in some embodiments, 0.01 up to 10 percent by weight, or, in yet other embodiments, 0.01 up to 5 percent by weight of the radiation polymerization initiator based on the total weight of the putty composition.

The putty compositions of the present invention also comprise a filler. As used herein, the term "filler" refers to an inert solid powder material, i.e., a powder material that is not reactive with any of the components present in the putty composition. Typically, fillers are included in coating compositions to substantially increase the viscosity of the composition and, therefore, substantially increase the film thickness at which the composition can be applied in a single layer. In certain embodiments of the putty compositions of the present invention, the filler comprises a polymer that is substantially transparent to ultraviolet radiation. The use of a polymeric filler is a distinguishing feature of the putty compositions of the present invention, as fillers in such compositions have previously typically been comprised of inorganic mineral powders, such as calcium carbonate, barium sulfate, silicates, talc, glass spheres and bubbles, slate flour, and clay.

The polymer present in the filler is not particularly limited. For example, in certain embodiments, the filler may comprise a polymer that is conventionally used in the production of powder coating compositions, such as acrylic resins, polyester resins, polyurethane resins, epoxy resins, and the like, including mixtures thereof. In certain embodiments, the filler consists essentially of such a polymer, whereas, in other embodiments, the polymer comprises at least 70 percent by weight of the filler, based on the total weight thereof. In other embodiments, the filler may consist of a powder coating composition, which comprises, in addition to such polymers, other coating components, such as pigments, inorganic fillers, light stabilizers, anti-oxidants, flow control agents, anti-popping agents, and catalyst.

As previously indicated, in certain embodiments, the filler comprises a polymer that is transparent to ultraviolet radiation (ultraviolet radiation refers to radiation having wavelengths from 180 to 400 nanometers), meaning that the polymer has the ability to pass ultraviolet radiation without significant deviation or absorption. In certain embodiments, the polymer transmits at least 90% of the ultraviolet radiation, i.e., no more than 10% is deviated or absorbed by the polymer. In certain embodiments, the polymer does not impart a color to the putty composition. In certain embodiments, the polymer has a refractive index of 1.5 to 1.6. Such polymers are commercially available. One example of a polymer that is substantially transparent to ultraviolet radiation, and which is suitable for use in the putty compositions of the present invention, is available as Fine-Clad® A-257 acrylic resin from Reichhold, Inc., Research Triangle Park, N.C.

In certain embodiments of the present invention, the filler comprises at least 5 percent by weight or, in some embodiments, 10 up to 80 percent by weight, or, in yet other embodiments, 30 up to 60 percent by weight, or, in other cases, 40 up to 50 percent by weight, based on the total weight of the putty composition.

In certain embodiments, the putty compositions of the present invention may comprise a monofunctional (meth)acrylate adhesion promoter. Specific monofunctional (meth)acrylates suitable for use in the compositions of the present invention include, without limitation, butyl (meth)acrylate, isobutyl (meth)acrylate, tert-butyl (meth)acrylate, hexyl (meth)acrylate, cyclohexyl (meth)acrylate, octyl (meth)acrylate, 2-(2-ethoxyethoxy) ethyl acrylate, 2-ethylhexyl (meth)acrylate, 3,3,5-trimethylhexyl (meth)acrylate, decyl (meth)acrylate, dodecyl (meth)acrylate, isododecyl (meth)acrylate, octadecyl (meth)acrylate, 2-hydroxyethyl (meth)acrylate, hydroxypropyl (meth)acrylate (isomer mixture), benzyl (meth)acrylate, phenoxyethyl (meth)acrylate, isobornyl (meth)acrylate, tetrahydrofurfuryl (meth)acrylate, dicyclopentyl (meth)acrylate and further (meth)acrylates which have a double bond capable of free radical polymerization. A monofunctional acrylate suitable for use in the radiation curable compositions of the present invention is commercially available as CD9050 from Sartomer Co., Exton, Pa.

In certain embodiments of the present invention, the monofunctional (meth)acrylate adhesion promoter comprises at least 0.1 percent by weight or, in some embodiments, 0.1 up to 5 percent by weight, or, in yet other embodiments, 1 up to 5 percent by weight, based on the total weight of the putty composition.

In certain embodiments, the putty compositions of the present invention comprise an optical brightener. As will be understood by those skilled in the art, optical brighteners are compounds that absorb ultraviolet light and convert the energy taken up into the longer wavelength visible portions of the spectrum. This is evidenced by a fluorescence.

Typically, the optical brighteners are aromatic or heterocyclic compounds often with condensed ring structures and with an uninterrupted chain of conjugated double bonds. Examples of optical brighteners are derivatives of diaminostilbenedisulfonic acid such as the bistriazinyl derivatives, i.e., those compounds of the structure:

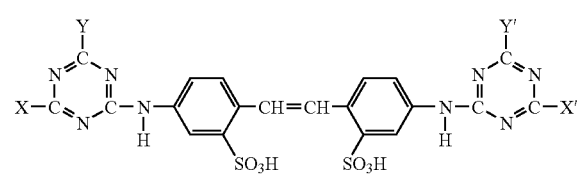

where X, X' and Y and Y' can be the same or different and include amino, substituted hydroxyl and chloro.

Examples of other optical brighteners are bisazoles such as those of the structure:

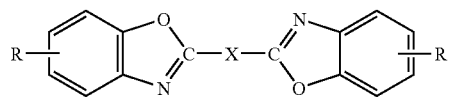

where R is hydrogen, alkyl and alkoxy and X is an unsaturated radical such as:

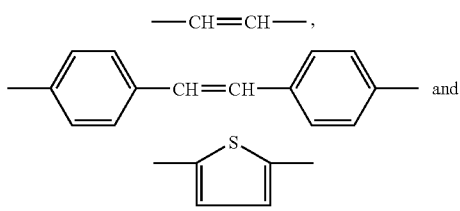

Bisazoles have an intense fluorescence upon exposure to ultraviolet light and are suitable for use in the putty compositions of the present invention. A suitable bisazole is 2,2'-(2,5-thiophenediyl)bis(5-tert-butylbenzoxazole), that is, R equals tertiarybutyl and X equals

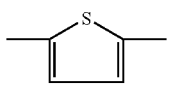

in the formula above.

Non-limiting examples of suitable optical brighteners include bisbenzoxazoles such as EASTOBRITE® OB-1 and OB-3, which are commercially available from Eastman Chemical Co. of Kingsport, Tenn. as well as the UVITEX® products which are commercially available from Ciba-Geigy Corp. of Greensboro, N.C.

In certain embodiments, the optical brightener is present in the composition in amounts of at least 0.1, usually 0.1 to 2.5 percent by weight based on total weight of the composition. The amount of the optical brightener present in the putty composition can range between any combination of these values inclusive of the recited values.

The putty compositions of the present invention can also comprise other optional ingredients, such as other resinous materials, plasticizers, anti-oxidants, solvents, surfactants, flow control agents, anti-settling agents, and the like. When present, these materials are generally used at a level of less than 25 percent, such as less than 10 percent by weight, based on the total weight of resin solids in the putty composition. The compositions may also contain colorants, such as dyes or pigments.

The present invention is also directed to methods for refinishing a substrate. As used herein, the term "refinish" refers to the process of repairing damage, such as scratches, dent, or holes, to the surface or finish of an article. The refinishing methods of the present invention comprise the steps of: (a) applying to at least a portion of the substrate a putty composition of the present invention; (b) curing the putty composition by exposing the composition to radiation; and (c) applying to at least a portion of the substrate a protective and/or decorative coating system.

The refinishing methods of the present invention comprise the step of applying a putty composition to at least a portion of a substrate. The step of applying the putty composition to the substrate can be performed by any of the conventional application methods known to those skilled in the art, such as with a brush, wipe, roller, razor blade, a spatula or putty-knife. In certain embodiments, the application step can be performed by, for example, first obtaining a slightly greater amount of the putty composition than is necessary to fill the damaged portion of the substrate. A suitable portion of the putty composition may then be applied to the damaged portion of the substrate with, for example, a spatula or putty-knife. Further portions of the putty composition may then be superimposed over the first portion, using, for example, a spatula or putty-knife, in one or more successive applications. In certain embodiments, after the putty composition has been applied, the thickness of the applied putty composition may be thicker than the thickness of the original coating.

The refinishing methods of the present invention also comprise the step of exposing the putty composition to radiation. In certain embodiments, the putty composition is exposed to ultraviolet radiation. Moreover, in certain embodiments, the refinishing methods of the present invention comprise the step of exposing the putty composition to low intensity ultraviolet radiation. In certain embodiments, the putty compositions of the present invention can be cured relatively quickly, i.e., within about 2 to 5 minutes, by exposing the composition to low intensity ultraviolet radiation, while achieving favorable performance properties, such as sanding, adhesion and humidity properties, among others. The irradiation of ultraviolet rays can be performed using, for example, an apparatus that generates light containing ultraviolet rays, such as a UV lamp. UV lamps that generate low intensity ultraviolet radiation, which are suitable for use in the methods of the present invention, include, without limitation, the UV-H 254 Hand Lamp, commercially available from Panacol-Elosol GmbH, Oberursel, Germany, and the UVAHAND 250 UV Curing Lamp, commercially available from Dedoes Industries, Inc., Welled Lake, Mich.

As a result of the irradiation of ultraviolet rays, the putty composition cures, i.e., hardens, and the damaged portion of the substrate is filled with the cured putty composition. In certain embodiments of the refinishing methods of the present invention, the surface of the putty composition may then be sanded to smoothen that surface. For example, the surface of the cured putty composition may be elevated from the surface of the adjacent portions of the substrate coated with an original coating. Thus, the surface of the cured putty composition may be ground to the level of the original coating using, for example, a sander.

The methods of the present invention also comprise the step of applying a protective and/or decorative coating system to at least a portion of the substrate. Protective and/or decorative coating systems that may be used in the methods of the present invention include, for example, those protective and decorative coating systems that are conventionally used in automotive refinish coating applications, among others. Examples of suitable protective and decorative coating systems that may be applied in accordance with the methods of the present invention include single layer coating systems, such as pigmented direct gloss coating systems, and multi-layered systems, such as systems that include a pigmented basecoat layer and a clear top coating layer.

In certain embodiments, one or more layers of the protective and/or decorative coating system may be deposited from a coating composition that includes a polymeric composition that is thermosetting. As used herein, by "thermosetting" is meant a polymeric composition that "sets" irreversibly upon curing or crosslinking, wherein the polymer chains of the polymeric components are joined together by covalent bonds. This property is usually associated with a cross-linking reaction of the composition constituents often induced, for example, by heat or radiation. See Hawley, Gessner G., The Condensed Chemical Dictionary, Ninth Edition., page 856; Surface Coatings, vol. 2, Oil and Colour Chemists' Association, Australia, TAFE Educational Books (1974). Curing or crosslinking reactions also may be carried out under ambient conditions. Once cured or crosslinked, a thermosetting resin will not melt upon the application of heat and is insoluble in solvents. In other embodiments, one or more layers of the protective and/or decorative coating system may be deposited from a coating composition that includes a polymeric composition that is thermoplastic. "Thermoplastic" polymeric compositions comprise polymeric components that are not joined by covalent bonds and thereby can undergo liquid flow upon heating and are soluble in solvents. See Saunders, K. J., Organic Polymer Chemistry, pp. 41-42, Chapman and Hall, London (1973).

In certain embodiments, one or more layers of the protective and/or decorative coating system may be deposited from a coating composition that includes a polymeric composition that includes, without limitation, hydroxyl or carboxylic acid-containing acrylic copolymers, and hydroxyl or carboxylic acid-containing polyester polymers and oligomers and isocyanate or hydroxyl-containing polyurethane polymers, or amine or isocyanate-containing polyureas.

The acrylic polymers, if used, are typically copolymers of acrylic acid or methacrylic acid or hydroxyalkyl esters of acrylic or methacrylic acid such as hydroxyethyl methacrylate or hydroxypropyl acrylate with one or more other polymerizable ethylenically unsaturated monomers such as alkyl esters of acrylic acid including methyl methacrylate and 2-ethyl hexyl acrylate, and vinyl aromatic compounds such as styrene, alpha-methyl styrene and vinyl toluene. The ratio of reactants and reaction conditions are selected to result in an acrylic polymer with pendant hydroxyl or carboxylic acid functionality.

Besides acrylic polymers, one or more layers of the protective and/or decorative coating system may be deposited from a coating composition that includes a polymeric composition that includes a polyester polymer or oligomer. Such polymers may be prepared in a known manner by condensation of polyhydric alcohols and polycarboxylic acids. Suitable polyhydric alcohols include ethylene glycol, neopentyl glycol, trimethylol propane and pentaerythritol.

Suitable polycarboxylic acids include adipic acid, 1,4-cyclohexyl dicarboxylic acid and hexahydrophthalic acid. Besides the polycarboxylic acids mentioned above, functional equivalents of the acids such as anhydrides where they exist or lower alkyl esters of the acids such as the methyl esters may be used. Also, small amounts of monocarboxylic acids such as stearic acid may be used.

Hydroxyl-containing polyester oligomers can be prepared by reacting an anhydride of a dicarboxylic acid such as hexahydrophthalic anhydride with a diol such as neopentyl glycol in a 1:2 molar ratio.

Where it is desired to enhance air-drying, suitable drying oil fatty acids may be used and include, for example, those derived from linseed oil, soya bean oil, tall oil, dehydrated castor oil or tung oil, among others.

The polyesters may contain free terminal hydroxyl and/or carboxyl groups that are available for further crosslinking reactions.

Polyurethane polymers containing terminal isocyanate or hydroxyl groups may also be used in the coating compositions from which one or more layers of such protective and/or decorative coating systems are deposited. The polyurethane polyols or NCO-terminated polyurethanes that can be used include those prepared by reacting polyols including polymeric polyols with polyisocyanates. The polyurea-containing terminal isocyanate or primary or secondary amine groups which can be used are those prepared by reacting polyamines including polymeric polyamines with polyisocyanates. The hydroxyl/isocyanate or amine/isocyanate equivalent ratio is adjusted and reaction conditions selected to obtain the desired terminal group. Examples of suitable polyisocyanates are those described in U.S. Pat. No. 4,046,729 at column 5, line 26 to column 6, line 28, hereby incorporated by reference. Examples of suitable polyols are those described in U.S. Pat. No. 4,046,729 at column 7, line 52 to column 10, line 35, hereby incorporated by reference. Examples of suitable polyamines are those described in U.S. Pat. No. 4,046,729 at column 6, line 61 to column 7, line 32 and in U.S. Pat. No. 3,799,854 at column 3, lines 13 to 50, both hereby incorporated by reference.

In certain embodiments, one or more layers of the protective and/or decorative coating system may be deposited from a curable coating composition that includes a curing agent, such as aminoplast resins and phenoplast resins and mixtures thereof, as curing agents for OH and COOH, and amide and carbamate functional group containing materials. Examples of aminoplast and phenoplast resins suitable as curing agents in the curable compositions of the present invention are those described in U.S. Pat. No. 3,919,351 at col. 5, line 22 to col. 6, line 25, hereby incorporated by reference.

Polyisocyanates and blocked polyisocyanates as curing agents for OH and primary and/or secondary amino group containing materials are well known in the art. Examples of suitable polyisocyanates and blocked isocyanates include those described in U.S. Pat. No. 4,546,045 at col. 5, lines 16 to 38; and in U.S. Pat. No. 5,468,802 at col. 3, lines 48 to 60, both hereby incorporated by reference.

Anhydrides as curing agents for OH and primary and/or secondary amino group containing materials are well known in the art. Examples of suitable anhydrides include those described in U.S. Pat. No. 4,798,746 at col. 10, lines 16 to 50; and in U.S. Pat. No. 4,732,790 at col. 3, lines 41 to 57, both hereby incorporated by reference.

Polyepoxides as curing agents for COOH functional group containing materials are well known in the art. Examples of suitable polyepoxides include those described in U.S. Pat. No. 4,681,811 at col. 5, lines 33 to 58, hereby incorporated by reference.

Polyacids as curing agents for epoxy functional group containing materials are well known in the art. Examples of suitable polyacids include those described in U.S. Pat. No. 4,681,811 at col. 6, line 45 to col. 9, line 54, hereby incorporated by reference.

Polyols, that is, a material having an average of two or more hydroxyl groups per molecule, can be used as curing agents for NCO functional group containing materials and anhydrides and esters and are well known in the art. Examples of suitable polyols include those described in U.S. Pat. No. 4,046,729 at col. 7, line 52 to col. 8, line 9; col. 8, line 29 to col. 9, line 66; and in U.S. Pat. No. 3,919,315 at col. 2, line 64 to col. 3, line 33, both hereby incorporated by reference.

Polyamines can also be used as curing agents for NCO functional group containing materials and for carbonates and unhindered esters and are well known in the art. Examples of suitable polyamines include those described in U.S. Pat. No. 4,046,729 at col. 6, line 61 to col. 7, line 26, hereby incorporated by reference.

In certain embodiments, one or more layers of the protective and/or decorative coating system may be deposited from a coating composition that includes, in addition to the components described above, a variety of other adjuvant materials. If desired, other polymeric compositions can be utilized in conjunction with the polymeric compositions described above so long as the resultant coating composition is not detrimentally affected in terms of application, physical performance and appearance properties.

In certain embodiments, one or more layers of the protective and/or decorative coating system may be deposited from a coating composition that includes a catalyst to accelerate the cure reaction, examples of suitable catalysts include organotin compounds such as dibutyl tin dilaurate, dibutyl tin oxide and dibutyl tin diacetate. Catalysts suitable for promoting the cure reaction between an aminoplast curing agent and the reactive hydroxyl and/or carbamate functional groups of the thermosettable dispersion include acidic materials, for example, acid phosphates such as phenyl acid phosphate, and substituted or unsubstituted sulfonic acids such as dodecylbenzene sulfonic acid or paratoluene sulfonic acid.

In certain embodiments, one or more layers of the protective and/or decorative coating system may be deposited from a coating composition that includes one or more other additive ingredients, including those which are well known in the art of formulating surface coatings, such as dyes, pigments, surfactants, flow control agents, thixotropic agents, fillers, anti-gassing agents, organic co-solvents, catalysts, and other customary auxiliaries. Examples of these materials and suitable amounts are described in U.S. Pat. Nos. 4,220,679, 4,403,003, 4,147,769 and 5,071,904, which are incorporated herein by reference.

The coating compositions from which one or more layers of the protective and/or decorating coating system are deposited may be applied by any conventional coating technique, such as brushing, spraying, dipping, or flowing, among others.

In certain embodiments, the protective and/or decorative coating system comprises, in addition to either the single layer pigmented direct gloss coating, or the multi-layered coating comprising a pigmented basecoat layer and a clear top coating layer, a primer surfacer layer. As will be appreciated by those skilled in the art, a primer surfacer layer is often deposited as part of a protective and/or decorative coating system in order to enhance the coating properties of the system, such as adhesion and scratch resistance. One advantage of the putty compositions of the present invention, however, is that such properties can be achieved without the addition of a primer surfacer layer. As a result, in certain embodiments of the methods of the present invention, a primer surfacer layer is not applied to the substrate.

In the embodiments of the present invention wherein a primer surfacer layer is applied to the substrate as part of the protective and/or decorative coating system, such a layer is applied prior to the application of either the single layer pigmented direct gloss coating or the multi-layered coating comprising a pigmented basecoat layer and a clear top coating layer. After application of the primer surface layer, the substrate may be cleaned and sanded prior to application of the remaining coating layers.

In certain embodiments, the primer surfacer layer is deposited from a primer surfacer composition that is radiation curable. Moreover, in certain embodiments, such a composition is cured by exposing the composition to low intensity radiation, such as low intensity ultraviolet radiation. Thus, in certain embodiments, the refinishing methods of the present invention comprise the step of exposing a primer surfacer composition to low intensity ultraviolet radiation. In certain embodiments, such a composition can be cured relatively quickly, i.e., within about 2 minutes, by exposing the composition to low intensity ultraviolet radiation. The irradiation of ultraviolet rays can be performed using, for example, an apparatus that generates light containing ultraviolet rays, such as those mentioned earlier with respect to the putty composition of the present invention.

Primer surfacer compositions suitable for use in the methods of the present invention are commercially available. One such composition is available as D8080 UV Cured Primer Surfacer from PPG Industries, Inc.

The putty compositions of the present invention can be applied to any of a variety of substrate materials, such as aluminum, steel, thermoplastic polyolefins, polycarbonate, thermoplastic elastomer, polyester thermoset, polyurethane, thermoplastic polyurethane, sheet molded compound, fiberglass reinforced polyester, among others.

As should be apparent from the foregoing description, the present invention is also directed to methods for improving the curability of a radiation curable putty composition when using low intensity ultraviolet radiation as the curing means. These methods comprise the step of including in the radiation curable putty composition a filler comprising a polymer that is transparent to ultraviolet radiation.

As should also be apparent, the present invention is also directed to articles coated with the compositions of the present invention and articles coated by the methods of the present invention.

Illustrating the invention are the following examples, which, however, are not to be considered as limiting the invention to their details. Unless otherwise indicated, all parts and percentages in the following examples, as well as throughout the specification, are by weight.

EXAMPLES

Examples 1 and 2 describe the preparation of putty compositions of the present invention. Comparative examples 3 and 4 describe the preparation of comparative putty compositions outside the scope of the present invention.

Example 1

To a suitable vessel equipped with a Cowles blade agitator, 36.2 pounds of CN-132 (an epoxy diacrylate oligomer commercially available from Sartomer Co., Inc., Exton, Pa.) was charged. Under low speed Cowles blade agitation, 40.8 pounds of Fine-Clad A-257 (a powder acrylic resin commercially available from Reichhold, Inc., Research Triangle Park, N.C.), 6.4 pounds of Sylysia 350 (a silica gel commercially available from Fuji Silysia Chemical Ltd., Portland, Oreg.), and 2.0 pounds of Sartomer 9050 (an acidic monoacrylate commercially available from Sartomer Co., Inc., Exton, Pa.) were charged to the vessel. Agitation was increased and this mixture was stirred for 20 minutes. Agitation was continued until the contents had a Hegman grind rating of 4.0. The contents of the vessel were kept below 140° F. (60° C.).

In a second vessel equipped with a Cowles blade agitator, 13.6 pounds of Acetone CP (from Dow Chemical Company), and 0.03 pounds of Uvitex OB (an optical brightener commercially available from Ciba-Geigy Corp. of Greensboro, N.C.) were charged under low speed agitation. Agitation Was then increased and this mixture was stirred for 10 minutes.

With the first mixture at a temperature of less than 120° F. (49° C.), the mixture of the second vessel was added to the first mixture. Then, 0.9 pounds of Darocur 4265 (a photoinitiator commercially available from Ciba Specialty Chemical Corp., Tarrytown, N.Y.) was added under low speed agitation. The resulting mixture was stirred at high speed for 30 minutes.

Example 2

To a suitable vessel equipped with a Cowles blade agitator, 42.4 pounds of CN-132 was charged. Under low speed Cowles blade agitation, 45.7 pounds of PCC10103H (a powder coating composition comprising an acrylic polymer commercially available from PPG Industries, Inc.), 7.5 pounds of Sylysia 350, and 2.4 pounds of Sartomer 9050 were charged to the vessel. Agitation was increased and this mixture was stirred for 20 minutes. Agitation was continued until the contents had a Hegman grind rating of 4.0. The contents of the vessel were kept below 140° F. (60° C.).

In a second vessel equipped with a Cowles blade agitator, 1.0 pounds of Acetone CP, 0.04 pounds of Uvitex OB, and 1.1 pounds of Darocur 4265 were charged under low speed agitation. Agitation was then increased and this mixture was stirred for 10 minutes. With the first mixture at a temperature of less than 120° F. (49° C.), the mixture of the second vessel was added to the first mixture. The resulting mixture was stirred at high speed for 30 minutes.

Comparative Example 3

To a suitable vessel equipped with a Cowles blade agitator, 90.01 pounds of CN-132 was charged. Under low speed Cowles blade agitation, 2.3 pounds of Bentone SD-2 (an organophilic clay commercially available from Elementis plc, East St. Louis, Ill.), 4.6 pounds of Sil-Cell 43 (glass zeospheres commercially available from Silbrico Corp., Hodgkins, Ill.), and 3.1 pounds of Darocur 4265 were charged under low speed agitation. The resulting mixture was stirred until uniform.

Comparative Example 4

To a suitable vessel equipped with a Cowles blade agitator, 61.0 pounds of CN-132 was charged. Under low speed Cowles blade agitation, 23.3 pounds of SB-336 (alumina trihydrate commercially available from J. M. Huber Corp., Edison, N.J.), and 10.8 pounds of Sylysia 350 were added. The mixture was stirred at high speed until uniform. Then, 3.4 pounds of Sartomer 9050 and 1.5 pounds of Darocur 4265 were charged under low speed agitation. The resulting mixture was stirred until uniform.

Test Substrates 5, 10 and 15 gram samples of the putty compositions prepared in Examples 1, 3 and 4 were poured into tins. The tins were placed under a UV-H 254 Hand Lamp (commercially available from Panacol-Elosol GmbH, Oberursel, Germany) at a 4-inch distance for 30 minutes (this distance and time was selected to avoid the possibility of boiling the material in the tins due to the extreme thickness of the sample). The putty was then removed from the tin and any unreacted putty was wiped off with a paper towel. The tins were then rinsed with an acetone/water mixture (65 percent by weight acetone and 35 percent by weight water) and allowed to dry. The cured putty was then weighed. Results are set forth in Table 1.

TABLE 1

| Example | Weight Before Cure | Weight After Cure | % Cure |
|---------|--------------------|--------------------|--------|
| 1 | 5 grams | 4.5 grams | 90% |
| 3 | 5 grams | 4.9 grams | 98% |
| 4 | 5 grams | 4.4 grams | 88% |
| 1 | 10 grams | 9.9 grams | 99% |
| 3 | 10 grams | 5.7 grams | 57% |
| 4 | 10 grams | 8.8 grams | 88% |
| 1 | 15 grams | 14.8 grams | 98.7% |
| 3 | 15 grams | 4.6 grams | 30.7% |
| 4 | 15 grams | 13.2 grams | 88% |

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

What is claimed is:

1. A radiation curable putty composition comprising:
    (a) a radiation curable material;
    (b) a radiation cure initiator; and
    (c) a filler comprising a polymer that transmits at least 90% of ultraviolet radiation having a wavelength from 180-400 nanometers, and having a refractive index of 1.5 to 1.6.
2. The composition of claim 1, wherein the composition is of a thickness sufficient to enable the composition to be applied at a film thickness of at least 20 mils in a single layer.
3. The composition of claim 2, wherein the composition is of a thickness sufficient to enable the composition to be applied at a film thickness of at least 70 mils in a single layer.
4. The composition of claim 1, wherein the radiation curable material comprises a multi-functional (meth)acrylate having a (meth)acrylate functionality greater than 1.
5. The composition of claim 4, wherein the multi-functional (meth)acrylate comprises a low viscosity difunctional epoxy acrylate.
6. The composition of claim 1, wherein the putty composition comprises at least 30 percent by weight of the radiation curable material, based on the total weight of the putty composition.
7. The composition of claim 1, wherein the radiation cure initiator comprises a photoinitiator.
8. The composition of claim 1, wherein the filler comprises a polymer selected from acrylics, polyesters, polyurethanes, epoxies, or a mixture thereof.
9. The composition of claim 1, wherein the polymer comprises at least 70 percent by weight of the filler.
10. The composition of claim 8, wherein the filler comprises an acrylic polymer that is substantially transparent to ultraviolet radiation.
11. The composition of claim 1, wherein the composition comprises:
    (a) at least 30 percent by weight of the radiation curable material;
    (b) 0.01 up to 15 percent by weight of the radiation cure initiator;
    (c) at least 5 percent by weight of the filler;
    (d) at least 0.1 percent by weight of an adhesion promoter; and
    (e) at least 0.1 percent by weight of an optical brightener.

12. A method for refinishing a substrate, comprising:
(a) applying to at least a portion of the substrate the putty composition of claim 1;
(b) curing the putty composition, to form a cured putty composition, by exposing the putty composition to radiation; and
(c) applying to at least a portion of the substrate and the cured putty composition a protective and/or decorative coating system.

13. The method of claim 12, wherein the putty composition is cured by exposing the composition to low intensity ultraviolet radiation.

14. The method of claim 13, wherein the putty composition is cured by exposing the composition to low intensity ultraviolet radiation for 2 to 5 minutes.

15. The method of claim 12, further comprising the step of sanding the cured putty composition prior to applying the protective and/or decorative coating system.

16. The method of claim 12, wherein the protective and/or decorative coating system is selected from a pigmented direct gloss coating system and a multi-layered system comprising a pigmented basecoat layer and a clear top coating layer.

17. The method of claim 12, wherein the protective and/or decorative coating system does not include a primer surfacer layer.

18. A substrate at least partially coated with the putty composition of claim 1.

19. A substrate at least partially coated by the method of claim 12.

20. A method for improving the curability of a radiation curable putty composition when using low intensity ultraviojet radiation as the curing means, comprising:
including in the radiation curable putty composition a filler comprising a polymer that transmits at least 90% of ultraviolet radiation having a wavelength from 180-400 nanometers, and having a refractive index of 1.5 to 1.6.

* * * * *